United States Patent [19]

Ichiryu et al.

[11] Patent Number: 4,464,978
[45] Date of Patent: Aug. 14, 1984

[54] SERVOVALVE APPARATUS

[75] Inventors: Ken Ichiryu, Mito; Haruo Watanabe; Masami Nemoto, both of Ibaraki, Japan

[73] Assignee: Hitachi, Ltd., Tokyo, Japan

[21] Appl. No.: 349,860

[22] Filed: Feb. 18, 1982

[30] Foreign Application Priority Data

Mar. 23, 1981 [JP] Japan .................................. 56-40350

[51] Int. Cl.³ .......................................... F15B 13/044
[52] U.S. Cl. .................................. 91/459; 137/625.65
[58] Field of Search ................................ 91/459, 466; 137/625.64, 625.65; 251/129

[56] References Cited

U.S. PATENT DOCUMENTS

| | | | |
|---|---|---|---|
| 3,126,031 | 3/1964 | Hayner | 137/625.64 |
| 3,516,441 | 6/1970 | McCormick | 137/625.64 |

FOREIGN PATENT DOCUMENTS

| | | | |
|---|---|---|---|
| 38128 | 10/1981 | European Pat. Off. | 91/459 |
| 2143798 | 3/1973 | Fed. Rep. of Germany | 267/181 |
| 4534351 | 7/1966 | Japan | 137/625.65 |

*Primary Examiner*—Robert E. Garrett
*Assistant Examiner*—John M. Husar
*Attorney, Agent, or Firm*—Beall Law Offices

[57] ABSTRACT

A servovalve apparatus comprising a servovalve and a force motor operatively connected to a valve element of the servovalve for driving the valve element. The force motor includes an annular magnet, and first and second members cooperating with each other to define therebetween an annular gap concentric with the annular magnet. A cylindrical coil operatively connected to the valve element is disposed in the annular gap in concentric relation therewith and is reciprocated within the annular gap in response to the electric current passing through the coil. First and second cylindrical resilient members thermally connect one and the other axial ends of the cylindrical coil to first and second stoppers, respectively, to transmit the Joule heat generated by the coil to the first and second stoppers.

18 Claims, 6 Drawing Figures

SERVOVALVE APPARATUS

BACKGROUND OF THE INVENTION

1. Field of the Invention

The present invention relates to a servovalve apparatus and, more particularly, to a servovalve apparatus of the type having a servovalve and a force motor operatively connected to a valve element reciprocatably received in a bore formed in the body of the servovalve, for reciprocating the valve element within the bore.

2. Description of the Prior Art

The servovalve apparatus of the type mentioned above is disclosed in, for example, Japanese Patent Laid-open No. 24975/78. The force motor of this known servovalve apparatus includes first and second magnet yokes which clamp therebetween an annular magnet. The first and second magnet yokes cooperate with each other to define therebetween an annular gap concentric with the annular magnet, so that the magnetic fluxes generated by the annular magnet are concentrated in the annular gap. The first magnet yoke is attached to the end of the valve body of the servovalve such that the annular gap communicates with the bore in the valve body. The second magnet yoke has therein a central bore concentric with the annular gap and extending through the second magnet yoke coaxially with the bore in the valve body.

A connecting member has a hollow cylindrical wall positioned in the annular gap concentrically therewith, and an end wall closing the axial one end of the hollow cylindrical wall adjacent to the valve body and integrally connected to the axial end of the valve element reciprocatably received in the valve body, adjacent to the above-mentioned axial end of the hollow cylindrical wall.

A cylindrical coil has a multiplicity of turns wound around the hollow cylindrical wall of the connecting member concentrically therewith. The cylindrical coil is connected to the valve element through the connecting member. Each turn of the coil has a circular cross-section. The cylindrical coil is reciprocated within the annular gap in response to the electric current passing through the coil. The reciprocating motion of the cylindrical coil is transmitted to the valve element through the connecting member.

The neutral position of the valve element in the bore of the valve body is adjustable by means of a neutral position adjuster which includes a cylindrical resilient member made of a rubber or the like and loosely received by the central bore in the second magnet yoke with an axial one end of the resilient member fixed to the surface of the end wall of the connecting member opposite to the valve element, a rod having one axial end abutting the other axial end of the cylindrical resilient member, and a feeder connected to the end of the second magnet yoke opposite to the valve element and engaging the other axial end of the rod to cause an axial movement of the rod in one and the other directions within the central bore in the second magnet yoke. Thus, the end wall of the connecting member is connected to the second magnet yoke through the cylindrical resilient member.

As the cylindrical coil is energized, the coil generates heat in accordance with the Joule's law. Most of the heat thus produced is transmitted through air layers in contact with the cylindrical coil to the first and second magnet yokes and dispersed to the atmosphere. The remaining small part of the heat, which is not transmitted to the magnet yokes, is conducted to the valve element through the connecting member and also to the second magnet yoke through the connecting member, cylindrical resilient member, rod and the feeder.

The rate of heat transmission to the first and second magnet yoke through the air layers is low. The rate of heat transmission to the valve element and cylindrical resilient member through the connecting member is also low because the end wall of the connecting member has a thin thickness. Accordingly, the Joule heat generated by the cylindrical coil is confined within the annular gap to undesirably raise the temperature of the cylindrical coil. The elevated temperature prevents the electric current passing through the cylindrical coil from being increased and, hence, it is impossible to increase the force imparted to the cylindrical coil in proportion to the electric current passing therethrough. This in turn makes it difficult to drive at high speed the valve element connected to the cylindrical coil.

SUMMARY OF THE INVENTION

Accordingly, an object of the invention is to provide a servovalve apparatus capable of effectively dispersing the Joule heat generated by the cylindrical coil to make it possible to drive the valve element at a high speed.

To this end, according to the invention, there is provided a servovalve apparatus comprising: a servovalve including a valve body having therein a bore and a valve element received in the bore for reciprocal movement; and a force motor operatively connected to the valve element for reciprocating the valve element within the bore in the valve body, the force motor including first and second members cooperating with each other to define therebetween an annular gap, an annular magnet disposed in the annular gap concentrically therewith so that the magnetic fluxes of the magnet are concentrated in the annular gap, a cylindrical coil operatively connected to the valve element for movement therewith, the cylindrical coil being disposed in the annular gap concentrically therewith and reciprocatable in response to the electric current passing through the cylindrical coil, a first stop disposed opposite to but spaced from the axial end of the cylindrical coil and a second stop disposed opposite to but spaced from the other axial end of the cylindrical coil, and first and second cylindrical resilient members made of heat-conductive material and disposed in coaxial relation with the cylindrical coil, the first cylindrical resilient member being disposed between the first stop and the one axial end of the cylindrical coil and the second cylindrical resilient member being disposed between the second stop and the other axial end of the cylindrical coil to thermally connect the cylindrical coil to the first and second stops, respectively.

The other objects, features and advantages of the invention will become clear from the following description of the preferred embodiments taken in conjunction with the accompanying drawings.

DETAILED DESCRIPTION OF THE PREFERRED EMBODIMENTS

Figure 1:
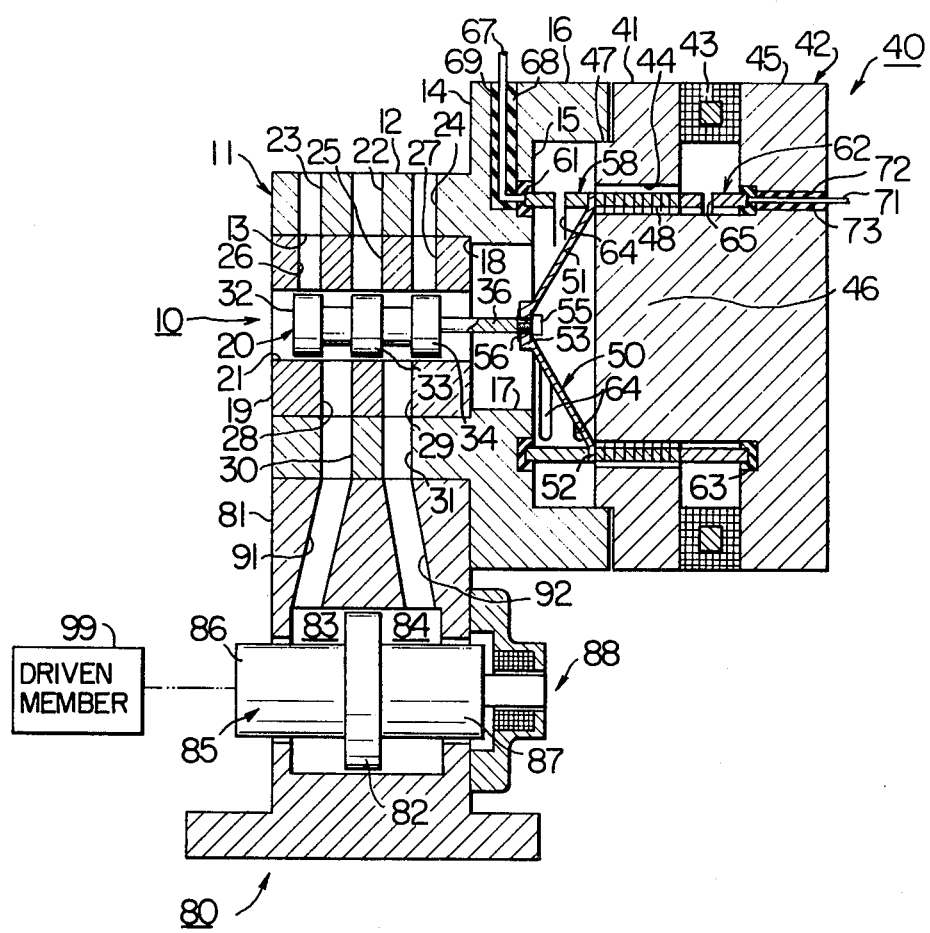
FIG. 1 is a schematic sectional view of a servovalve apparatus in accordance with an embodiment of the invention.

Referring first to FIG. 1, there is shown in cross-section a servovalve apparatus in accordance with an embodiment of the invention, which comprises a pilot servovalve generally designated by a reference character 10, a force motor generally designated by a reference character 40 for driving the pilot servovalve 10, and an actuator generally designated by a reference character 80 for actuating a driven member 99 such as a valve element of a main servovalve, in response to the pilot pressure signal from the pilot servovalve.

The pilot servovalve 10 has a valve body 11 which includes a hollow cylindrical portion 12 having therein a cylindrical bore 13, an end wall 14 formed integrally with one axial end of the hollow cylindrical portion 12 adjacent to the force motor 40, and an annular extension 16 formed integrally with the end wall 14 and protruding from the end surface 15 of the end wall 14 toward the force motor 40. The end wall 14 has a central bore 17 which communicates with the cylindrical bore 13 and which is less in diameter than that of the bore 13 to define a shoulder 18. A hollow cylindrical sleeve 19 is fitted in the cylindrical bore 13 with the sleeve abutting against the shoulder 18. A spool valve element 20 is received in a bore 21 in the sleeve 19 for reciprocal movement therein.

The valve body 11 has an inlet port 22 and a pair of outlet ports 23, 24. The hollow cylindrical sleeve 19 is provided with ports 25, 26 and 27 which are aligned with the inlet and outlet ports 22, 23, 24, respectively and communicate with the bore 21 in the hollow cylindrical sleeve 19. The hollow cylindrical sleeve 19 is further provided with a pair of pressure ports 28 and 29 which are formed in the wall portion diametrically opposite to the wall portion of the sleeve where the ports 25, 26, 27 are formed. These pressure ports 28, 29 are aligned, respectively, with a pair of ports 30 and 31 which are formed in the valve body 11.

The spool valve element 20 has three lands 32, 33, 34 axially spaced from each other and integrally connected to each other through reduced-diameter portions of the spool valve element 20. In the neutral position of the valve element, these lands close the ports 25, 26, 27, and open the ports 28, 29. The valve element 20 has a rod 36 projecting from the center of the end surface of the end land 34 through the central bore 17 in the end wall 14 of the valve body 11.

The force motor 40 includes first and second magnet yokes 41 and 42 which clamp therebetween an annular solenoid or permanent magnet 43. The first and second magnet yokes 41, 42 cooperate with each other to define therebetween an annular gap 44 concentric with the annular magnet 43 so that the magnetic fluxes produced thereby are concentrated in the annular gap 44. More specifically, the first magnet yoke 41 has a generally ring-like form, while the second magnet yoke 42 has a circular body 45 and a central projection 46 extending from the body 45 into the bore in the first magnet yoke 41. The first and second magnet yokes 41, 42 are connected to each other by suitable fastening means with the annular magnet disposed therebetween. The annular gap 44 is defined by the inner peripheral surface of the first magnet yoke 41, i.e. the wall surface of the bore of the first magnet yoke 41, and the peripheral surface of the central projection 46 of the second magnet yoke 42. The first magnet yoke 41 is fixed by suitable fastening means to the annular extension 16 of the valve body 11, in such a manner that a shoulder 47 on the first magnet yoke 41 is fitted in the bore formed in the annular extension 16, Thus, the assembly of the first and second magnet yokes 41, 42 is connected to the valve body 11, such that the end surfaces of the magnet yokes 41, 42 adjacent to the servo valve 10 are spaced from the end surface 15 of the end wall 14 of the valve body 11.

A cylindrical coil 48 is disposed in the annular gap 44 concentrically therewith, and has a multiplicity of turns bonded to each other through electrical-insulating coatings. The turns of the coil 48 each have a rectangular cross-section and are wound in a single layer. The coil 48 has one axial and thereof spaced from the end surface 15 of the end wall 14 of the valve body 11 and the other axial end spaced from the end surface of the circular body 45 of the magnet yoke adjacent to the valve body 11. When an electric current i passes through the cylindrical coil 48, the coil is subjected to an electromagnetic force (F) which is determined by the equation $F = B \cdot l \cdot i$, where l represents the axial length of the coil and B represents the density of magnetic fluxes formed in the annular gap 44 by the annular magnet 43. In consequence, the cylindrical coil is moved within the annular gap 44 in one or the other axial direction dependent upon the direction of the electric current.

Figure 2:
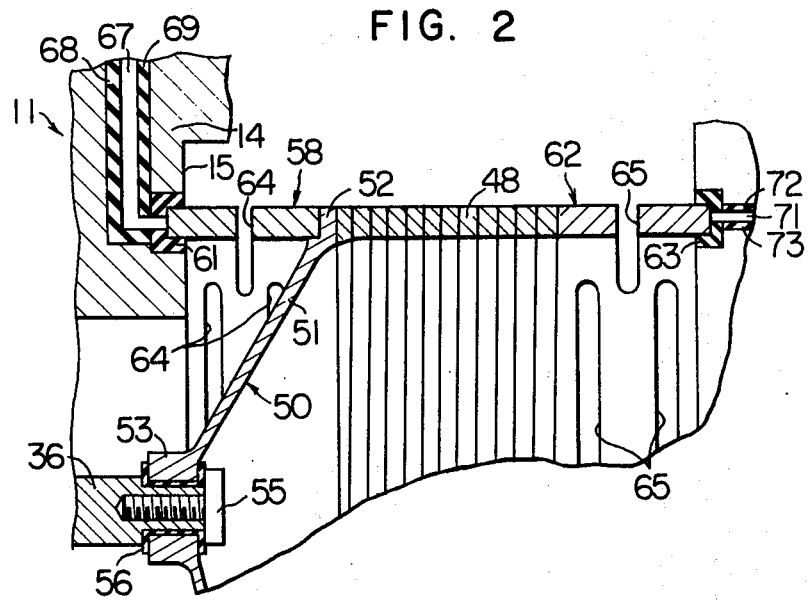
FIG. 2 is an enlarged sectional view of an essential part of the servovalve apparatus shown in FIG. 1.

As will be best seen from FIG. 2, a metallic connecting member 50 has a conical portion 51, a flange 52 formed at the large-diameter end of the conical portion 51 and a flange 53 formed at the smaller-diameter end of the same. The flange 52 is fixed to the one axial end of the cylindrical coil 48, while the flange 53 is connected, through an electrically insulating ring 56 made of rubber, plastic or the like, to an annular groove which is defined by the reduced-diameter free end of the rod 36 of the valve element 20 and a screw 55 screwed into the above-mentioned free end of the rod 36. Thus, the cylindrical coil 48 is substantially rigidly connected to the spool valve element 20, through the connecting member 50.

A first cylindrical resilient member 58 is, as is also shown in FIG. 2, disposed under compression between the cylindrical coil 48 and the end surface 15 of the end wall 14 of the valve body 11, coaxially and axially aligned with the cylindrical coil 48. One axial end of the first cylindrical resilient member 58 is urged against the one axial end of the cylindrical coil 48 and is electrically connected thereto through the end flange 52 with the end flange 52 positioned between the one axial end of the resilient member 58 and the one axial end of the first cylindrical resilient member 58. The other axial end of the first cylindrical resilient member 58 is received, through an electrically insulating ring 61 of a rubber, plastic or the like, in an annular groove formed in the end surface 15 of the end wall 14 of the valve body 11. A second cylindrical resilient member 62 is disposed under compression between the cylindrical coil 48 and the end surface of the circular body 45 of the second magnet yoke 42, axially aligned and coaxially with the cylindrical coil 48. One axial end of the second cylindrical resilient member 62 is in direct contact with the other axial end of the cylindrical coil 48 and electrically connected thereto. The other axial end of the second cylindrical resilient member 62 is received, through an electrically insulating ring 63 made of a rubber, plastic or the like, in an annular groove formed in the end surface of the circular body 45 of the second magnet yoke 42. Thus, the first and second cylindrical resilient members 58 and 62 are pressed against the cylindrical coil 48 to support the latter, thereby to neutralize the position of the valve element 20 connected to the coil 48 through the connecting member 50. As will be understood from the foregoing description, the end wall 14 of the valve body 11 constitutes a stopper for the first cylindrical resilient member 58, while the circular body 45 of the second magnet yoke 42 constitutes a stopper for the second cylindrical resilient member 62.

Figure 3:
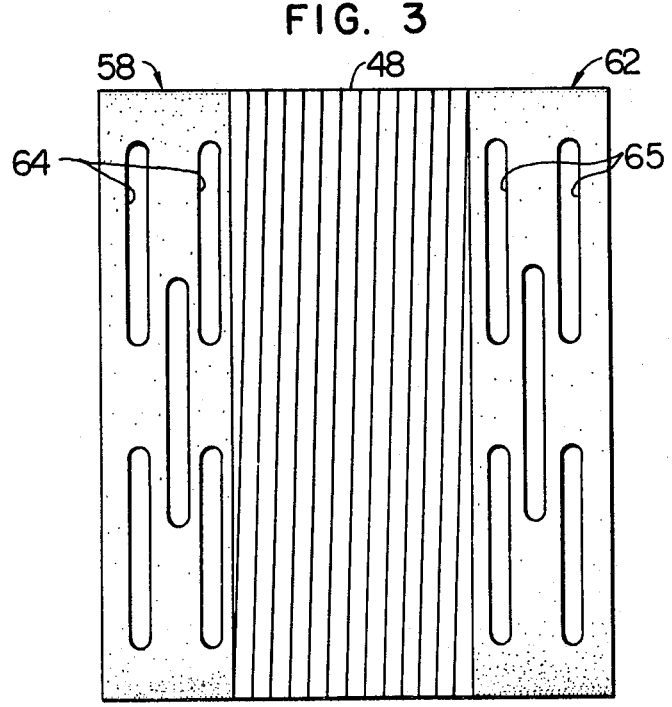
FIG. 3 is a developed view of the cylindrical resilient members and the cylindrical coil shown in FIG. 1.

As will be seen from FIG. 3, the first and second cylindrical resilient members 58 and 62 are provided with a plurality of axially spaced circumferential grooves 64 and 65, respectively, to increase the resiliency of the first and second cylindrical resilient members 58, 62. The first and second cylindrical resilient members are made of an electrically and thermally conductive material, preferably a spring steel. The configurations of the cylindrical resilient members 58, 62 illustrated in FIG. 3 are not exclusive, and these members may take the forms of coiled springs.

A lead line 67 extends through a radial bore formed in the end wall 14 of the valve body 11 and has an end connected to the other axial end of the first cylindrical resilient member 58. An annular gap between the wall of the radial bore 68 and the lead line 67 is filled with an insulator 69 of the same material as the insulating ring 61, so that the lead line 67 is electrically insulated from the valve body 11. Another lead line 71 extends through an axial bore 72 formed in the circular body 45 of the second magnet yoke 42 and has one end electrically connected to the other axial end of the second cylindrical resilient member 62. An annular gap between the wall of the axial bore 72 and the lead line 71 is filled with an insulator 73 of the same material as the insulating ring 63, so that the lead line 71 is electrically insulated from the second magnet yoke 42. Thus, the electric current flows through the lead line 67 to the cylindrical coil 48 via the first cylindrical insulating member 58 and the end flange 52 of the connecting member 50, and further to the lead line 71, and vice versa.

An actuator 80 includes a housing 81 fixed to the valve body 11 and having an internal cavity which receives therein a piston 82 for reciprocal movement in the axial direction. The piston 82 divides the internal cavity into two pressure chambers 83 and 84. A piston rod 85 extends through the piston 82 and has one and the other axial ends 86 and 87 projecting from the opposite end walls of the housing 81 through the end walls, respectively. A displacement detector 88 is connected to the other axial end 87 of the piston rod 85 so as to detect the axial displacement of the piston 82. The one end 86 of the piston rod 85 is connected to the driven member 99. The pressure chambers 83 and 84 are communicated with ports 30 and 31, respectively, through passages 91 and 92 formed in the housing 81.

In operation, when an electrical current is supplied to the cylindrical coil 48 from the lead line 67 through the first cylindrical resilient member 58 and the end flange 52 of the connecting member 50, the cylindrical coil 48 is subjected to the force in accordance with the aforementioned equation $F=B\cdot l\cdot i$, and is moved to the right in FIG. 1. The first cylindrical resilient member 58 is stretched and the second cylindrical resilient member 62 is compressed. The movement of the cylindrical coil 48 is transmitted through the connecting member 50 to the valve element 20 to displace the latter to the right as viewed in FIG. 1. This causes the central land 33 and the other end land 34 to open the ports 25 and 27, respectively, while the port 26 is closed by the end land 32. In consequence, a pressurized fluid is introduced into the pressure chamber 83 from the inlet port 22 through the port 25, port 28, port 30 and the passage 91, thereby to displace the piston 82 and the piston rod 85 to the right as viewed in FIG. 1. Meanwhile, the fluid in the pressure chamber 84 is discharged from the outlet port 24 through the passage 92, port 31, port 29 and port 27. When an electric current is supplied to the cylindrical coil 48 from the lead line 71 through the second cylindrical resilient member 62, the cylindrical coil 48 is moved to the left as viewed in FIG. 1, to compress and stretch the first and second cylindrical resilient members 58 and 62, respectively, so that the valve element 20 is moved to the left as viewed in FIG. 1. This causes the central land 33 and the end land 32 to open the ports 25 and 26, respectively, while the port 27 is closed by the end land 34. In consequence, the pressurized fluid is introduced into the pressure chamber 84 from the inlet port 22 through the port 25, port 29, port 31 and the passage 92, thereby to displace the piston 82 and the piston rod 85 to the left as viewed in FIG. 1. On the other hand, the fluid in the pressure chamber 83 is discharged from the outlet port 23 via the passage 91, port 30, port 28 and the port 26.

The cylindrical coil 48, when energized, produces Joule heat. Most of this heat is transmitted through the first and second resilient members 58, 62 to the valve body 11 and the second magnet yoke 42. Thus, the first and second cylindrical resilient members 58 and 62 thermally connect the cylindrical coil 48 to the valve body 11 and the second magnet yoke 42. The remaining part of the heat produced by the cylindrical coil 48 is transferred to the first and second magnet yokes 41, 42 through air layers.

The one and the other axial ends of the cylindrical coil 48 are thermally connected, respectively, to the valve body 11 and the second magnet yoke 42 through the first and second cylindrical resilient members 58 and 62. Therefore, the Joule heat produced by the cylindrical coil 48 is rapidly transmitted to the valve body 11 and the second magnet yoke 42, so that the temperature rise of the coil 48 is effectively restrained. In addition, since the cylindrical coil 48 is supported resiliently at its both ends by the first and second cylindrical resilient members 58 and 62, it is possible to increase the radial thickness of the coil 48 to locate the outer and inner peripheral surfaces of the cylindrical coil as close as possible to the wall surface of the bore in the first magnet yoke 41 and the peripheral surface of the central projection 46 of the second magnet yoke 42, respectively. In consequence, the radial dimension of each of the air layers between the first magnet yoke 41 and the cylindrical coil 48 and between the cylindrical coil 48 and the second magnet yoke 42 is reduced so that a part of the Joule heat produced by the cylindrical coil 48 is effectively transferred to the first and second magnet yokes through the air layers of reduced radial dimension to further restrain the increase in temperature of the coil 48. Since the temperature rise of the coil 48 is effectively suppressed as explained hereinbefore, it is possible to cause high electric current to pass through the cylindrical coil 48, and the coil is subjected to high electromagnetic force and is reciprocated at a high speed. This enables the valve element 20 connected to the coil 48 through the connecting member 50 to be driven at a high speed.

Moreover, since the Joule heat produced by the coil 48 is effectively dissipated or dispersed, it is possible to reduce the axial width of each turn of the coil to increase the length thereof. In other words, even if the coil 48 is increased in length and is increased in the electric resistance, the heat generated by the coil is effectively dispersed for the abovedescribed reason, and it is possible to increase the value of "l" in the equation ($F=B \cdot l \cdot i$) so that the force (F) imparted to the coil 48 can be increased.

Figure 4:
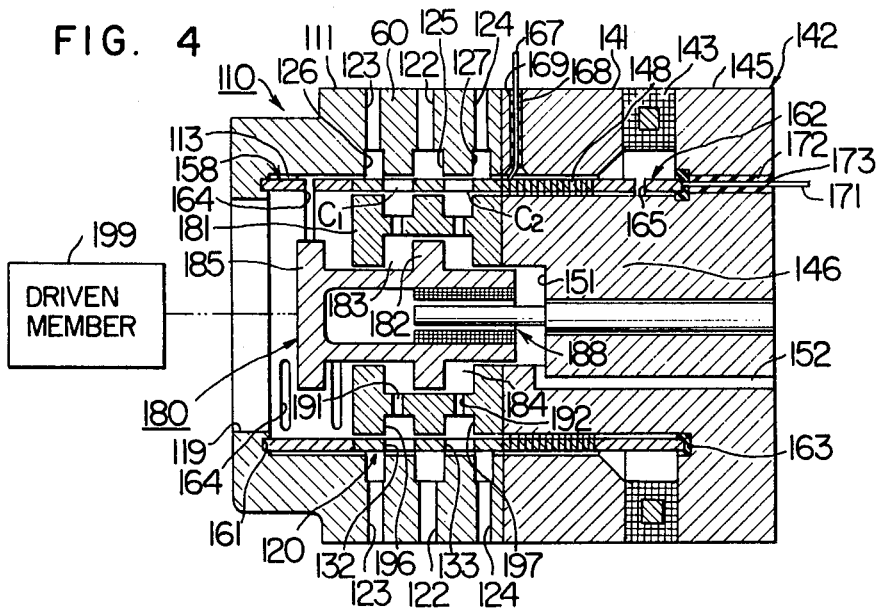
FIG. 4 is a schematic sectional view of a servovalve apparatus in accordance with another embodiment of the invention.

Referring now to FIG. 4, there is shown in section a servovalve apparatus in accordance with another embodiment of the invention, which comprises a pilot servovalve generally designated by reference character 110, a force motor generally designated by reference character for driving the pilot servovalve 110, and an actuator generally designated by reference character 180 for actuating a driven member 199 such as a valve element of a main servovalve, in response to the pilot pressure signal from the pilot servovalve.

The pilot servovalve 110 includes a valve body 111 having therein a cylindrical bore 113 and provided with an annular projection 119 radially inwardly at one end of the body 111. The valve body 111 is provided with a pair of first outlet ports 123 diametrically opposite to each other, a pair of second outlet ports 124 diametrically opposite to each other, and a pair of inlet ports 122 diametrically opposite to each other and positioned between the first and second outlet ports. The valve body 111 is further provided with annular grooves 126, 125 and 127 formed in the wall surface of the cylindrical bore 113. These annular grooves 126, 125 and 127 are in communication with the first outlet ports 123, inlet ports 122 and the second outlet ports 124, respectively. A hollow cylindrical valve element 120 is reciprocatably received in the cylindrical bore 113. As will also be seen from FIGS. 5 and 4, the valve element 120 is provided with two axially spaced circumferential grooves 132, 133 which have an angular extension greater than 180°. These circumferential grooves are closed, when the valve element 120 is in the neutral position, by the wall portion of the cylindrical bore 113 between the annular grooves 126 and 125 and the wall portion of the cylindrical bore 113 between the annular grooves 125 and 127, respectively.

A force motor 140 has a first and second magnet yokes 141, 142 adapted to clamp therebetween an annular solenoid or permanent magnet 143. The first and second magnet yokes 141 and 142 cooperate with each other to define therebetween an annular gap in concentric relation with the annular magnet 143, so that the magnetic fluxes formed by the magnet are concentrated in the annular gap. More specifically, the first magnet yoke 141 has a generally ring-like form, while the second magnet yoke 142 comprises a circular body 145 and a central projection 146 projected therefrom into the bore in the first magnet yoke 141. The first magnet yoke 141 and the circular body 145 of the second magnet yoke 142 are connected to each other by suitable fastening means with an annular magnet 143 positioned therebetween. The annular gap is defined by the wall surface of the bore in the first magnet yoke 141 and the peripheral surface of the central projection 146 to the second magnet yoke 142. The first magnet yoke 141 is fixed by suitable fastening means to the other axial end of the valve body 111.

A cylindrical coil 148, similar to the cylindrical coil 48 of the first embodiment, is disposed in the annular gap. The cylindrical coil 148 has a diameter substantially equal to the diameter of the valve element 120 and has one axial end secured to one axial end of the valve element 120 and the other axial end spaced from the surface of the circular body 145 of the second magnet yoke 142 adjacent to the valve element 120.

A first cylindrical resilient member 158 has a diameter substantially equal to that of the valve element 120 and has one axial end in direct contact with the other axial end of the valve element 120 and the other axial end fitted in an annular groove 161 formed in the surface of the annular projection 119 of the valve body 111, adjacent to the valve element 120. The first cylindrical resilient member 158 is disposed under compression between the valve element 120 and the annular projection 119 and in coaxial relation with the valve element 120. A second cylindrical resilient member 162 has a diameter substantially equal to that of the cylindrical coil 148 and has one axial end in direct contact with and electrically connected to the other axial end of the cylindrical coil 148 and the other axial end received, as shown also in FIG. 5, in an annular groove formed in the surface of the circular body 145 of the second magnet yoke 142 adjacent to the valve element 120, through an electrically insulating ring 163 made of, for example, a rubber or a plastic. The second cylindrical resilient member 162 is disposed under compression between the cylindrical coil 148 and the circular body 145 and in coaxial relation with the cylindrical coil 148 to resiliently urge the cylindrical coil 148 against the valve element 120. The valve element 120 and the cylindrical coil 148 are resiliently supported by the first and second cylindrical resilient members 158, 162 so that the valve element 120 is located in the neutral position. As will be understood from the foregoing description, the annular projection 119 of the valve body 111 constitutes a stopper for the first cylindrical resilient member 158, while the circular body 145 of the second magnet yoke 142 constitutes a stopper for the second cylindrical resilient member 162.

Figure 6:
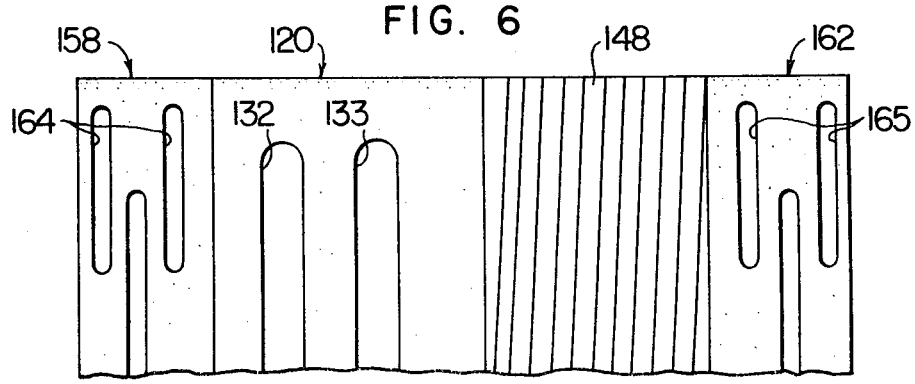
FIG. 6 is a fragmental developed view of the cylindrical resilient members, cylindrical coil and hollow cylindrical valve element shown in FIG. 4.

As shown in FIG. 6, the first and second cylindrical resilient members 158, 162 are provided with a plurality of axially spaced circumferential grooves 164, 165, respectively to increase the resiliency of the cylindrical resilient members 158, 162. The first and second cylindrical resilient members 158, 162 are made of the same material as the first and second cylindrical resilient members 58, 62 of the first embodiment shown in FIG. 1.

A lead line 167 extends through a radial bore 168 formed in the first magnet yoke 141 and has a flexible end electrically connected to one axial end of the cylindrical coil 148. An annular gap between the wall surface of the bore 168 and the lead line 167 is filled with an electrically insulating material 169. Another lead wire 171 extends through an axial bore 172 formed in the circular body 145 of the second magnet yoke 142 and has one end electrically connected to the other axial end of the second cylindrical resilient member 162. An annular gap between the wall surface of the bore 172 and the lead wire 171 is filled with an electrically insulating material 173.

The actuator 180 includes a cylindrical housing 181 which is disposed radially inwardly of the hollow cylindrical valve member 120 in concentric relation with the latter. The housing 181 has an axial end surface rigidly connected to the free end surface of the central projection 146 of the second magnet yoke 142. The housing 181 is provided in its outer peripheral surface with axially spaced circumferential grooves 196 and 197 which, in the neutral position of the valve element 120 are aligned with grooves 132, 133 formed in the valve element 120, respectively. The circumferential grooves 196, 197 are communicated, respectively, with two pairs of diametrically opposite passages 191, 192 which are formed in the housing 181. A piston 182 is received in a cavity defined in the housing 181 for reciprocal movement, to divide the cavity into two pressure chambers 183 and 184 which are in communication with the circumferential grooves 196, 197, respectively, through the passages 191 and 192. A hollow cylindrical piston rod 185 extends through the piston 182 and has axial open one end and the other closed end projecting from and through the opposite end walls of the housing 181, respectively. The open end of the piston rod 185 extends into the recess 151 formed in the end surface of the central projection 146 of the second magnet yoke 142. A space defined by the recess 151 and the open end of the piston rod 185 is communicated with the atmosphere through a passage 152. A displacement detector 188 is disposed in the hollow portion of the hollow piston rod 185 adjacent to the open end of the latter, and is adapted to detect the displacement of the piston 182. The closed end of the piston rod 185 is connected to the driven member 199.

In operation, as the electric current is supplied to the cylindrical coil 148 from the lead line 167, the cylindrical coil and the valve element 120 directly connected thereto are moved to the right as viewed in FIG. 4, to stretch and compress the first and second cylindrical resilient members 158 and 162, respectively. The rightward movement of the valve 120 causes the circumferential grooves 125, 127 in the valve body 111 to communicate with the circumferential grooves 196, 197 in the housing 181 through the circumferential grooves 132, 133 in the valve element 120, respectively, while the circumferential groove 126 in the valve body 111 is kept closed by the valve element 120. A pressurized fluid is introduced into the pressure chamber 183 from the inlet port 122 through the circumferential groove 125, circumferential groove 132, circumferential groove 196 and the passage 191, to move the piston 182 and the piston rod 185 to the right as viewed in FIG. 4. The fluid in the other pressure chamber 184 is discharged from the outlet port 124, via the passage 192, circumferential groove 197, circumferential groove 133 and the circumferential groove 127. When the electric current is supplied from the lead line 171 to the cylindrical coil 148, the cylindrical coil and the valve element 120 are moved to the left as viewed in FIG. 4 to compress and stretch the first and second cylindrical resilient members 158, 162, respectively. The leftward movement of the valve element 120 causes the circumferential grooves 126, 125 to communicate with the circumferential grooves 196, 197 through the circumferential grooves 132, 133, respectively, while the circumferential groove 127 is kept closed by the valve element 120.

The pressurized fluid is introduced from the inlet port 122 through the circumferential groove 125, circumferential groove 133, circumferential groove 197 and the passage 192, into the pressure chamber 184 thereby to displace the piston 182 and the piston rod 185 to the left. The fluid in the pressure chamber 183 is discharged from the outlet port 123 through the passage 191, circumferential groove 196, circumferential groove 132 and the circumferential groove 126.

Most of the Joule heat generated by the cylindrical coil 148 is transmitted to the valve body 111 through the hollow cylindrical valve element 120 and the first cylindrical resilient member 158, and also to the second magnet yoke 142 through the second cylindrical resilient member 142. Thus, the cylindrical coil 148 is thermally connected to the valve body 111 and the second magnet yokes 142 by the first and second cylindrical resilient members 158 and 162, respectively. The remaining part of the Joule heat generated by the cylindrical coil 148 is transferred to the first and second magnet yokes 141, 142 through air layers.

Figure 5:
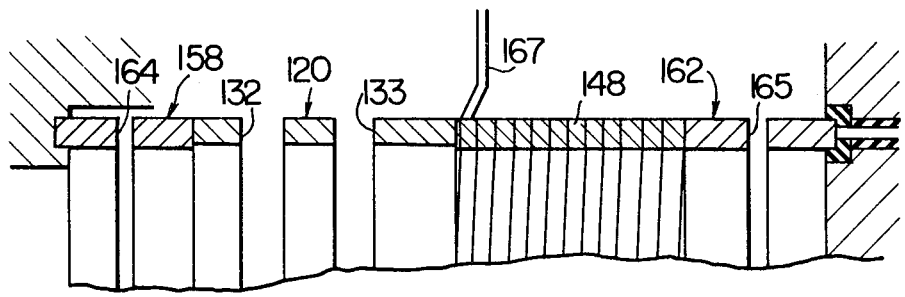
FIG. 5 is an enlarged sectional view of an essential part of the servovalve apparatus shown in FIG. 4.

The second embodiment explained hereinbefore in connection with FIGS. 4 thru 6 offers the following advantages in addition to the advantages brought about by the preceding embodiment. Namely, in this embodiment, the first and second cylindrical resilient members 158, 162, cylindrical coil 148 and the valve element 120 have a substantially equal diameter and are axially aligned with each other. Accordingly, it is not necessary to use any specific connecting member between the cylindrical coil and the valve element. This in turn permits the transmission of the force from the cylindrical coil to the valve element without any delay. Thus, this embodiment remarkably improves the response to the valve element to the input to the cylindrical coil. In addition, since the actuator 180 is disposed in the hollow cylindrical valve element 120 concentrically therewith, the length of the fluid passage between the pilot servovalve 110 and the actuator 180 is minimized to improve the response of the actuator.

What is claimed is:

1. A servovalve apparatus comprising:
a servovalve including a valve body having therein a bore and a valve element received in said bore for reciprocal movement; and
a force motor operatively connected to said valve element for reciprocating said valve element, within said bore in said valve body, said force motor including magnet means for producing magnetic flux, magnetic means defining an annular gap so that the magnetic fluxes of said magnet means are concentrated in said annular gap, an electrically conductive cylindrical coil operatively connected to said valve element for movement therewith, said cylindrical coil being disposed in said annular gap concentrically therewith and reciprocatable in response to an electric current passing through said cylindrical coil, a first stopper disposed opposite to but spaced from one axial end of said cylindrical coil and a second stopper disposed opposite to but spaced from the other axial end of said cylindrical coil, and first and second cylindrical spring means made of heat-conductive material and serially arranged in axially aligned relation with said cylindrical coil, said first cylindrical spring means being disposed between said first stopper and said one axial end of said cylindrical coil and said second cylindrical spring means being disposed between said second stopper and said other axial end of said cylindrical coil to thermally connect the opposite axial ends of said cylindrical coil to said first and second stoppers, respectively and to bias said cylindrical coil axially to a neutral position.

2. A servovalve apparatus as claimed in claim 1, wherein said cylindrical coil has a plurality of turns each having a rectangular cross-section, said first and second cylindrical spring means being disposed under compression between said first stopper and said one axial end of said cylindrical coil and between said second stopper and said the other axial end of said cylindrical coil, respectively, to urge the turns of said cylindrical coil against one another and to locate said cylindrical coil in a predetermined position.

3. A servovalve apparatus as claimed in claim 1, wherein the material of said first and second cylindrical spring means is electrically conductive, and wherein said force motor further includes a first lead line extending through said first stopper in electrically insulated relation thereto and a second lead line extending through said second stopper in electrically insulated relation thereto, said first cylindrical spring means having one axial end thereof in contact with said first stopper in electrically insulated relation thereto and electrically connected to said first lead line, and the other axial end electrically connected to said one axial end of said cylindrical coil, said second cylindrical spring means having one axial end thereof in contact with said second stopper in electrically insulated relation thereto and electrically connected to said second lead line, and the other axial end electrically connected to said other axial end of said cylindrical coil.

4. A servovalve apparatus as claimed in claim 1, wherein said first and second cylindrical spring means are made of a steel and are provided with a plurality of axially spaced circumferential grooves.

5. A servovalve apparatus as claimed in claim 4, wherein said force motor further includes a connecting member having one end thereof fixed to one axial end of said valve element in electrically insulated relation thereto and the other end clamped between said one axial end of said cylindrical coil and the axial end opposite thereto, of said first cylindrical spring means to substantially rigidly connect said valve element and said cylindrical coil to each other.

6. A servovalve apparatus as claimed in any one of claims 1, 2 and 3, wherein said force motor further includes a connecting member having one end thereof fixed to one axial end of said valve element in electrically insulated relation thereto and the other end clamped between said one axial end of said cylindrical coil and the axial end opposite thereto, of said first cylindrical spring means, to substantially rigidly connect said valve element and said cylindrical coil to each other.

7. A servovalve apparatus as claimed in claim 6, wherein said first and second cylindrical spring means and said cylindrical coil are disposed in coaxial relation with said valve element, said first stopper being provided by said valve body, and said second stopper being provided by said magnetic means.

8. A servovalve apparatus as claimed in any one of claims 1, 2, 3 and 4, wherein said servovalve is a pilot servovalve producing a pilot pressure signal in response to the reciprocal motion of said cylindrical coil, and servovalve apparatus further including an actuator which is operative in response to said pilot pressure signal to actuate a driven member, said actuator including:
a housing having a cylindrical cavity therein; a piston member disposed within said cylindrical cavity to divide the same into first and second pressure chambers;
a piston rod extending through the end wall of said housing to connect said piston member to said driven member; and
said pilot pressure signal being introduced into one of said first and second pressure chambers to displace said piston member together with said piston rod.

9. A servovalve apparatus as claimed in claim 8, wherein said valve element has a hollow cylindrical form, said housing having a cylindrical outer wall surface concentric with said cylindrical cavity therein, said housing being disposed within said valve element in concentric relation therewith.

10. A servovalve apparatus as claimed in claim 9, wherein said hollow cylindrical valve element has one axial end thereof in direct contact with said one axial end of said cylindrical coil and the other axial end in direct contact with said first cylindrical spring means, said valve element being disposed in coaxial relation with said first and second cylindrical spring means and said cylindrical coil.

11. A servovalve apparatus as claimed in claim 8, wherein said first stopper is provided by said valve body, and said second stopper is provided by said magnetic means.

12. A servovalve apparatus comprising: a servovalve including a valve body having therein a bore and a valve element received in said bore for reciprocal movement; and a force motor operatively connected to said valve element for reciprocating said valve element, within said bore in said valve body, said force motor including first and second members cooperating with each other to define therebetween an annular gap, an annular magnet disposed in said annular gap concentrically therewith so that the magnetic fluxes of said magnet are concentrated in said annular gap, a cylindrical coil operatively connected to said valve element for movement therewith, said cylindrical coil being disposed in said annular gap concentrically therewith and reciprocatable in response to an electric current passing through said cylindrical coil, a first stopper disposed opposite to but spaced from one axial end of said cylindrical coil and a second stopper disposed opposite to but spaced from the other axial end of said cylindrical coil, and first and second cylindrical resilient members made of heat-conductive material and disposed in coaxial relation with said cylindrical coil, said first cylindrical resilient member being disposed between said first stopper and said one axial end of said cylindrical coil and said second cylindrical resilient member being disposed between said second stopper and said the other axial end of said cylindrical coil to thermally connect said cylindrical coil to said first and second stoppers, respectively, the material of said first and second cylindrical resilient members being electrically conductive, said force motor including a first lead line extending through said first stopper in electrically insulated relation thereto and a second lead line extending through said second stopper in electrically insulated relation thereto, said first cylindrical resilient member having one axial end thereof in contact with said first stopper in electrically insulated relation thereto and electrically connected to said first lead line and the other axial end electrically connected to said one axial end of said cylindrical coil, said second cylindrical resilient member having one axial end thereof in contact with said second stopper in electrically insulated relation thereto and electrically connected to said second lead line and the other axial end electrically connected to said other axial end of said cylindrical coil.

13. A servovalve apparatus as claimed in claim 12, wherein said force motor further includes a connecting member having one end thereof fixed to one axial end of said valve element in electrically insulated relation thereto and the other end clamped between said one axial end of said cylindrical coil and the axial end operation thereto, of said first cylindrical resilient member, to substantially rigidly connect said valve element and said cylindrical coil to each other.

14. A servovalve apparatus as claimed in claim 13, wherein said first and second cylindrical resilient members and said cylindrical coil are disposed in coaxial relation with said valve element, said first stopper being provided by said valve body, and said second stopper being provided by one of said first and second members cooperating with each other to define therebetween said annular gap.

15. A servovalve apparatus as claimed in claim 12, wherein said servovalve is a pilot servovalve producing a pilot pressure signal in response to the reciprocal motion of said cylindrical coil, and servovalve apparatus further including an actuator which is operative in response to said pilot pressure signal to actuate a driven member, said actuator including:
- a housing having a cylindrical cavity therein; a piston member disposed within said cylindrical cavity to divide the same into first and second pressure chambers;
- a piston rod extending through the end wall of said housing to connect said piston member to said driven member; and
- said pilot pressure signal being introduced into one of said first and second pressure chambers to displace said piston member together with said piston rod.

16. A servovalve apparatus as claimed in claim 15, wherein said valve element has a hollow cylindrical form, said housing having a cylindrical outer wall surface concentric with said cylindrical cavity therein, said housing being disposed within said valve element in concentric relation therewith.

17. A servovalve apparatus as claimed in claim 16, wherein said hollow cylindrical valve element has one axial end thereof in direct contact with said one axial end of said cylindrical coil and the other axial end in direct contact with said first cylindrical resilient member, said valve element being disposed in coaxial relation with said first and second cylindrical resilient members and said cylindrical coil.

18. A servovalve apparatus as claimed in claim 17, wherein said first stopper is provided by said valve body, and said second stopper is provided by one of said first and second members cooperating with each other to define therebetween said annular gap.

* * * * *